Dec. 16, 1924.
1,519,243
G. E. ERICSSON
PROCESS AND APPARATUS FOR HANDLING GLASS SHEETS
Filed Dec. 5, 1923 2 Sheets-Sheet 2
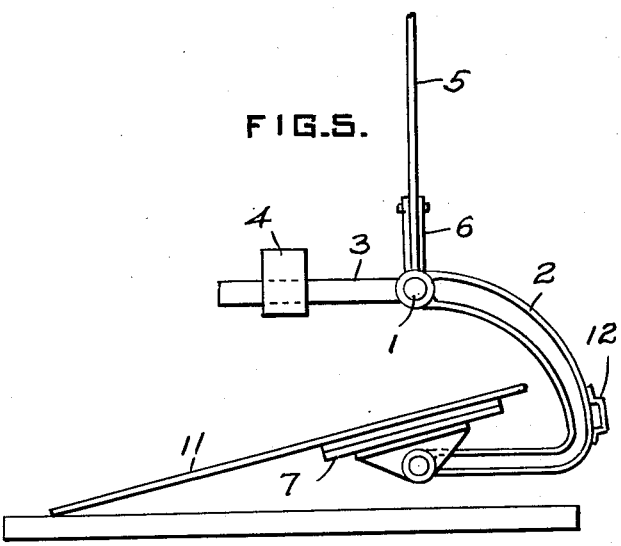
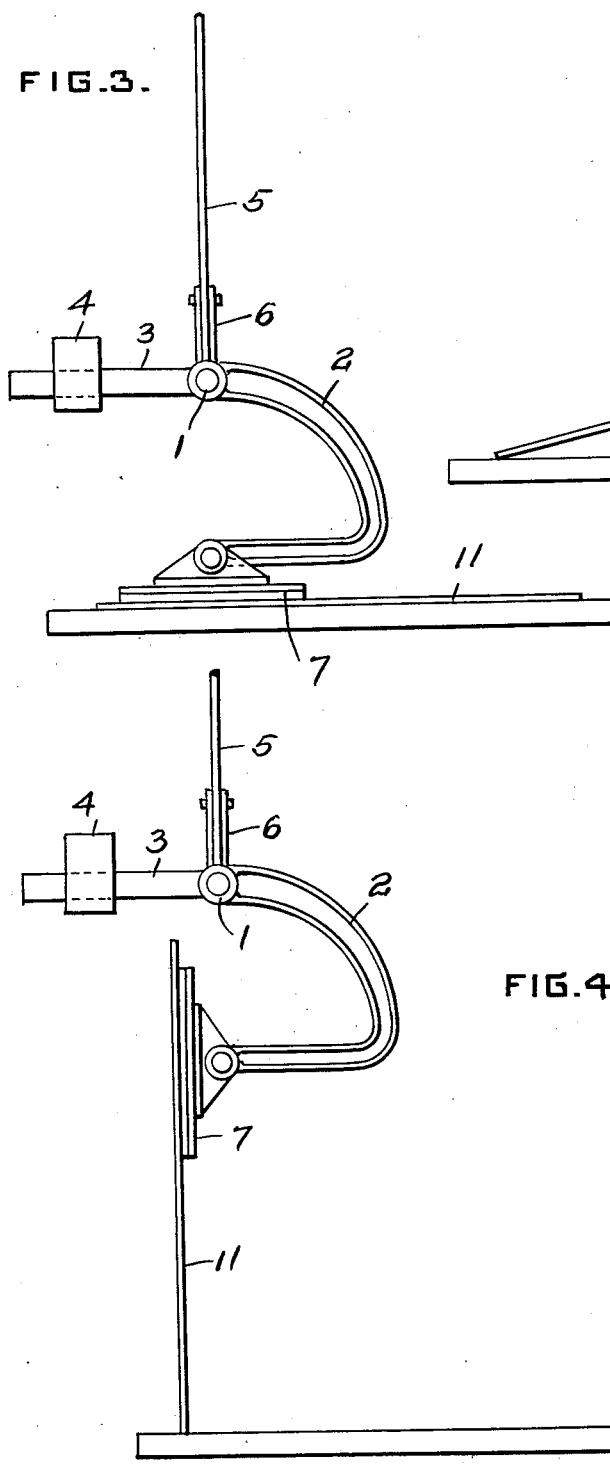
INVENTOR
Gustav E. Ericsson
by
James C. Bradley
Atty.

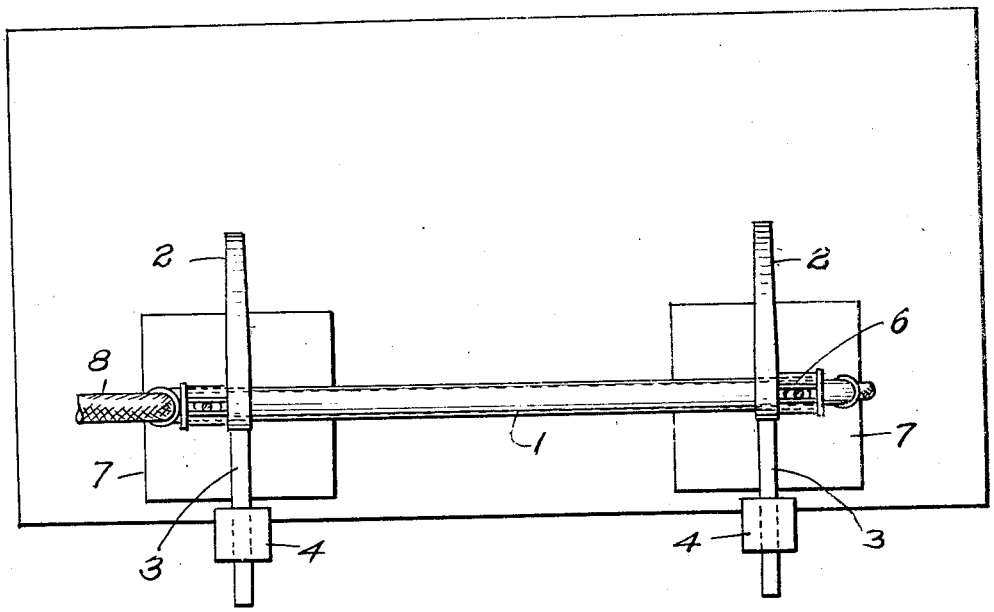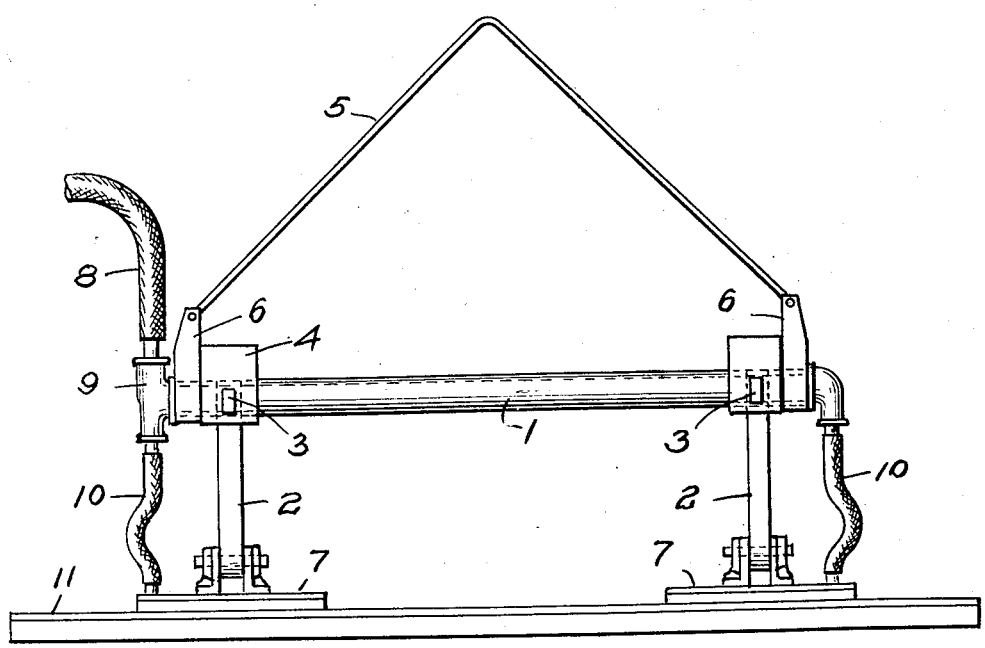

Patented Dec. 16, 1924.

1,519,243

UNITED STATES PATENT OFFICE.

GUSTAV EDWARD ERICSSON, OF FORD CITY, PENNSYLVANIA, ASSIGNOR TO PITTSBURGH PLATE GLASS COMPANY, A CORPORATION OF PENNSYLVANIA.

PROCESS AND APPARATUS FOR HANDLING GLASS SHEETS.

Application filed December 5, 1923. Serial No. 678,605.

*To all whom it may concern:*

Be it known that I, GUSTAV EDWARD ERICSSON, a citizen of the United States, and a resident of Ford City, in the county of Armstrong and State of Pennsylvania, have made a new and useful invention in Improvements in Processes and Apparatus for Handling Glass Sheets, of which the following is a specification.

The invention relates to apparatus of the vacuum type for lifting and turning over glass sheets and to the process for using it. The device and process are of general utility wherever it is necessary to turn a relatively large sheet of glass upside down, but are of particular utility in handling sheets of glass surfaced in the so-called straight away operation in which the glass sheets are ground and polished by passing them on cars or tables beneath a series of grinding and polishing machines. After one side of each sheet is ground and polished, it must be reversed to bring the rough side up and placed on the same car, or preferably on a different car, for surfacing its other side. The present apparatus and process are designed to accomplish this function, and the invention has for its primary object the provision of a very cheap, simple apparatus which will handle the glass safely and with a minimum amount of labor, and the provision of a method of handling the apparatus quickly and easily and without the imposition of any undue strain upon the glass tending to break it. One embodiment of the invention is illustrated in the accompanying drawings wherein:

Figure 1 is a plan view of the apparatus. Fig. 2 is a side elevation. And Figs. 3, 4 and 5 are end elevations showing the device in different positions of use.

The framework of the device consists of the pipe 1 provided with a pair of U shaped arms 2, 2 opening laterally as indicated in Figs. 3, 4 and 5, which arms have the upper legs thereof extended as indicated at 3 and provided with counterweights 4. The frame is adapted to be lifted from a crane (not shown) which engages the bail 5, such bail being attached at its ends to a pair of straps 6, 6 which encircle the pipe 1. Pivoted to the end of the lower leg of each of the arms 2 is a vacuum cup member 7 which is preferably square as indicated in Fig. 1 and from which the air may be exhausted to cause the cup to grip the glass in a manner well known in the art.

Provision is made for exhausting the air from the cups by means of the pipe 8 leading to the coupling 9 at one end of the pipe 1. This coupling communicates with the interior of the pipe 1 and connection is made to the vacuum cups by means of the flexible tubes 10, 10.

In using the device, after one side of the glass plate or sheet 11 has been ground and polished, the frame is lowered until the suction cups engage the glass plate adjacent one edge as indicated in Fig. 1, air being exhausted from the cups in order to cause them to grip the surface of the sheet. The crane is then operated to lift the sheet to a vertical position, and during this movement, the right hand edge of the sheet (Fig. 3) remains in contact with the table and the crane moves to the right as it moves upward. This brings the sheet to a vertical position above the right hand end of the table, after which the crane is raised a slight distance further to cause the sheet to clear the table and is then moved to the left to the position of Fig. 4 and lowered so that its edge again contacts with the table. The crane is now lowered and moved to the right until the glass is lowered to the position indicated in Fig. 5. The suction of the cups is then released and a slight amount of air pressure applied, after which the crane is moved further to the right and the cups slid from beneath the glass leaving the sheet free to be lowered by hand upon the table. This brings the unsurfaced side of the sheet up.

The foregoing operation is the one followed when the sheet is to be relaid upon the same table, such table being cleaned and supplied with a layer of plaster after the sheet is lifted clear of the table. In case the sheet is to be laid upon a different table, which will ordinarily be the case, the procedure of raising and lowering is similar, but after the sheet has been lifted to a vertical position and clears the table, the crane is moved either laterally or endwise into position over another car or table which has been prepared to receive the sheet. In order to facilitate the moving of the device to the right from the position indicated in Fig. 5, the arms 2 are preferably provided with handles 12 by means of which the frame may, if desired, be pulled laterally by the operators standing at the edge of the table without moving the crane to the right.

What I claim is:

1. A process for lifting a sheet of glass from a horizontal position on a support and turning it over, which consists in engaging the sheet adjacent one edge thereof, lifting the sheet to an upright position by turning it about its opposite edge as an axis which remains in contact with said support, and lowering the sheet to horizontal position to bring uppermost the side of the sheet which was originally down, the sheet being supported in such lowering movement at its lower edge.

2. A process for lifting a sheet of glass from a horizontal position on a table and turning it over and transferring it to a second table, which consists in engaging the sheet adjacent one edge thereof, lifting the sheet to an upright position by turning it about its opposite edge as an axis which remains in contact with said table, bringing the sheet over the second table, causing its lower edge to engage the second table, and lowering it to horizontal position on the table by turning it about said edge as an axis so as to bring uppermost the side of the sheet which was originally down.

3. A process for lifting a sheet of glass from a horizontal position on a support and turning it over, which consists in engaging the upper surface of the sheet adjacent one edge thereof, lifting the sheet to an upright position by turning it about its opposite edge as an axis which remains in contact with said support, and lowering the sheet to horizontal position to bring uppermost the side of the sheet which was originally down, the sheet being supported in such lowering movement at its lower edge.

4. A process for lifting a sheet of glass from a horizontal position on a table and turning it over and transferring it to a second table, which consists in engaging the upper surface of the sheet adjacent one edge thereof, lifting the sheet to an upright position by turning it about its opposite edge as an axis which remains in contact with said support, and lowering the sheet to horizontal position to bring uppermost the side of the sheet which was originally down, the sheet being supported in such lowering movement at its lower edge.

5. The process of lifting a glass sheet from a table and turning it over, which consists in applying pivoted suction means to the upper side of the sheet to be reversed at one side of its center line, lifting the sheet by said means till the sheet is in a vertical position, with the sheet turning during such movement about one edge which remains in contact with the table, then lowering the suction means with said edge of the sheet in contact with a table and causing it to tilt about such edge until the sheet approaches a horizontal position with the side to which the suction means are secured down, and releasing the suction means and removing it from beneath the glass.

6. A vacuum lifting and turning device for sheet glass comprising a U shaped frame opening laterally, a suction means pivoted to the lower leg of the frame and adapted to engage the sheet along one side, and lifting means secured to the upper leg of the U shaped frame.

7. A vacuum lifting and turning device for sheet glass comprising a U shaped frame lying in a vertical plane and opening laterally with the upper leg of the frame extended out beyond its lower end, suction means pivoted to the end of the lower leg of the frame and adapted to engage the sheet along one edge, lifting means secured to the upper leg of the frame above the suction means, and a counterweight secured to the extended portion of the upper leg.

In testimony whereof, I have hereunto subscribed my name this 2nd day of November, 1923.

GUSTAV EDWARD ERICSSON.